US011944987B2

(12) United States Patent
Lee et al.

(10) Patent No.: US 11,944,987 B2
(45) Date of Patent: Apr. 2, 2024

(54) PRESSURIZING CENTRIFUGAL DEHYDRATOR

(71) Applicant: LG CHEM, LTD., Seoul (KR)

(72) Inventors: Sang Ho Lee, Daejeon (KR); Dae Young Shin, Daejeon (KR); Sung Woo Jeong, Daejeon (KR); Eun Jung Joo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 609 days.

(21) Appl. No.: 17/269,203

(22) PCT Filed: Jul. 13, 2020

(86) PCT No.: PCT/KR2020/009206
§ 371 (c)(1),
(2) Date: Feb. 17, 2021

(87) PCT Pub. No.: WO2021/101011
PCT Pub. Date: May 27, 2021

(65) Prior Publication Data

US 2022/0016646 A1 Jan. 20, 2022

(30) Foreign Application Priority Data

Nov. 18, 2019 (KR) ........................ 10-2019-0147408

(51) Int. Cl.
*B04B 3/02* (2006.01)
*B04B 7/12* (2006.01)
(Continued)

(52) U.S. Cl.
CPC .................. *B04B 3/02* (2013.01); *B04B 7/12* (2013.01); *B04B 11/02* (2013.01); *B04B 15/12* (2013.01); *F26B 5/08* (2013.01)

(58) Field of Classification Search
CPC .. B04B 3/02; B04B 7/12; B04B 11/02; B04B 15/12; B04B 3/00; B04B 15/00;
(Continued)

(56) References Cited

U.S. PATENT DOCUMENTS 2,755,934 A 7/1956 Ruegg

FOREIGN PATENT DOCUMENTS

CH 655786 A5 * 5/1986 ............ B04B 15/12
CH 655786 A5 5/1986
(Continued)

OTHER PUBLICATIONS

CH 655786 Description Espacenet Machine Translation.*

*Primary Examiner* — Walter D. Griffin
*Assistant Examiner* — Shuyi S. Liu
(74) *Attorney, Agent, or Firm* — Bryan Cave Leighton Paisner LLP

(57) ABSTRACT

A pressurizing centrifugal dehydrator for removing moisture according to the present disclosure includes: an inner basket into which slurry is introduced; an outer basket surrounding the inner basket; a blocking barrier disposed in the outer basket; and a gas supplying portion for supplying gas into the inner basket and/or the outer basket, wherein a dehydration product is positioned between an outer circumference of the blocking barrier and an inner side of the outer basket to maintain airtightness of the outer basket.

8 Claims, 3 Drawing Sheets

(51) Int. Cl.
*B04B 11/02* (2006.01)
*B04B 15/12* (2006.01)
*F26B 5/08* (2006.01)

(58) Field of Classification Search
CPC ... B04B 1/00; B04B 11/00; F26B 5/08; F26B 3/06; F26B 5/041; F26B 21/001; F26B 25/002; F26B 25/18
See application file for complete search history.

(56) References Cited

FOREIGN PATENT DOCUMENTS

| | | | |
|---|---|---|---|
| CN | 203737427 | U | 7/2014 |
| JP | 06-77836 | U | 11/1994 |
| JP | 2004-230219 | A | 8/2004 |
| JP | 2007-136455 | A | 6/2007 |
| JP | 2011-56341 | A | 3/2011 |
| JP | 2015-144989 | A | 8/2015 |
| KR | 0145510 | B1 | 7/1998 |
| KR | 10-2006-0089881 | A | 8/2006 |
| KR | 10-2019-0026644 | A | 3/2019 |

* cited by examiner

-PRIOR ART-

PRESSURIZING CENTRIFUGAL DEHYDRATOR

CROSS-REFERENCE TO RELATED APPLICATIONS

The present application is a National Phase entry pursuant to 35 U.S.C. § 371 of International Application No. PCT/KR2020/009206, filed on Jul. 13, 2020, and claims the benefit of and priority to Korean Patent Application No. 10-2019-0147408, filed on Nov. 18, 2019, the disclosure of which in its entirety is incorporated by reference in their entirety for all purposes as if fully set forth herein.

TECHNICAL FIELD

The present invention relates to a pressurizing centrifugal dehydrator for removing moisture, and more particularly, to a pressurizing centrifugal dehydrator in which gas is injected into a basket in a state where the basket is airtight to improve dehydration performance using a pressurization force of the gas.

BACKGROUND ART

In a case of producing a polymer using an emulsion polymerization process, removal of moisture included in slurry generated after polymerization is a main issue. In the existing polymer producing process, a centrifugal dehydrator is generally used to primarily remove moisture, and finally, remaining moisture is completely removed through a drying process after centrifugal dehydration.

In the drying process, a hot-air drying method is generally used. In this case, however, energy cost is high, and thus it is a key point in improving process economic efficiency to decrease a moisture content before performing the drying process.

In general, as the centrifugal dehydrator, a pusher (push type) centrifugal dehydrator is used for a continuous process configuration. The pusher centrifugal dehydrator may be operated at a high speed to apply a high centrifugal force, and may be operated in a continuous process. Therefore, the pusher centrifugal dehydrator has been adopted and used in multiple processes.

However, there is a limitation in centrifugal force that may be provided by the pusher centrifugal dehydrator, and thus a moisture content of a product may not be decreased to below a predetermined value, which is problematic. Further, the pusher centrifugal dehydrator has a problem that a pipe for supplying slurry or washing water extends up to an inner basket, and thus pressure formation in the centrifugal dehydrator is hindered. In addition, a moisture content at the latter stage of the pusher centrifugal dehydrator depends on a characteristic (size or hydrophilicity) of a particle, and in a case where the size of a particle needs to be small for compounding, a moisture content is increased, which results in an increase in load in the drying process.

DISCLOSURE

Technical Problem

The present invention has been made in an effort to solve the above-described problems according to the related art, and an object of the present invention is to provide a pressurizing centrifugal dehydrator in which gas is injected into a basket in a state where the basket is airtight to improve dehydration performance using a pressurization force of the gas.

Technical Solution

To achieve the above-described object, the present invention provides a pressurizing centrifugal dehydrator for removing moisture, including: an inner basket into which slurry is introduced; an outer basket surrounding the inner basket; a blocking barrier disposed in the outer basket; and a gas supplying portion for supplying gas into the inner basket or the outer basket, wherein a dehydration product is positioned between an outer circumference of the blocking barrier and an inner side of the outer basket to maintain airtightness of the outer basket.

In the pressurizing centrifugal dehydrator according to the present invention, a gas supplying portion hole through which the gas supplying portion penetrates is formed in the blocking barrier.

In the pressurizing centrifugal dehydrator according to the present invention, a slurry supplying portion hole through which a slurry supplying portion for supplying the slurry to the inner basket penetrates is formed in the blocking barrier.

In the pressurizing centrifugal dehydrator according to the present invention, a washing water supplying portion hole through which a washing water supplying portion for supplying washing water to the inner basket penetrates is formed in the blocking barrier.

In the pressurizing centrifugal dehydrator according to the present invention, the dehydration product positioned between the outer circumference of the blocking barrier and the inner side of the outer basket is discharged due to a dehydration product pushed from an inside of the outer basket.

In the pressurizing centrifugal dehydrator according to the present invention, the dehydration product is continuously discharged by passing between the outer circumference of the blocking barrier and the inner side of the outer basket.

In the pressurizing centrifugal dehydrator according to the present invention, the blocking barrier includes: a blocking barrier rotating portion that is fixed to the outer basket and rotates together with the outer basket; a blocking barrier fixing portion that is disposed inside the blocking barrier rotating portion and is fixed; and a rotating-fixing connection portion disposed between the blocking barrier rotating portion and the blocking barrier fixing portion.

In the pressurizing centrifugal dehydrator according to the present invention, the rotating-fixing connection portion fixes the blocking barrier fixing portion while allowing rotation of the blocking barrier rotating portion.

In the pressurizing centrifugal dehydrator according to the present invention, an inclined portion is formed in the blocking barrier rotating portion.

Advantageous Effects

With the pressurizing centrifugal dehydrator according to the present invention, gas can be injected into the basket by the gas supplying portion in a state where the basket is airtight due to the blocking barrier, such that it is possible to significantly improve dehydration performance using a pressurization force of the gas, as compared with the centrifugal dehydrator according to the related art.

With the pressurizing centrifugal dehydrator according to the present invention, a pressurization centrifugal dehydration technique can be applied while maintaining the components of the centrifugal dehydrator according to the related art without any change. Therefore, an existing device is reusable.

BEST MODE

Hereinafter, preferred embodiments of the present invention will be described in detail with reference to the exemplary drawings.

Figure 4:
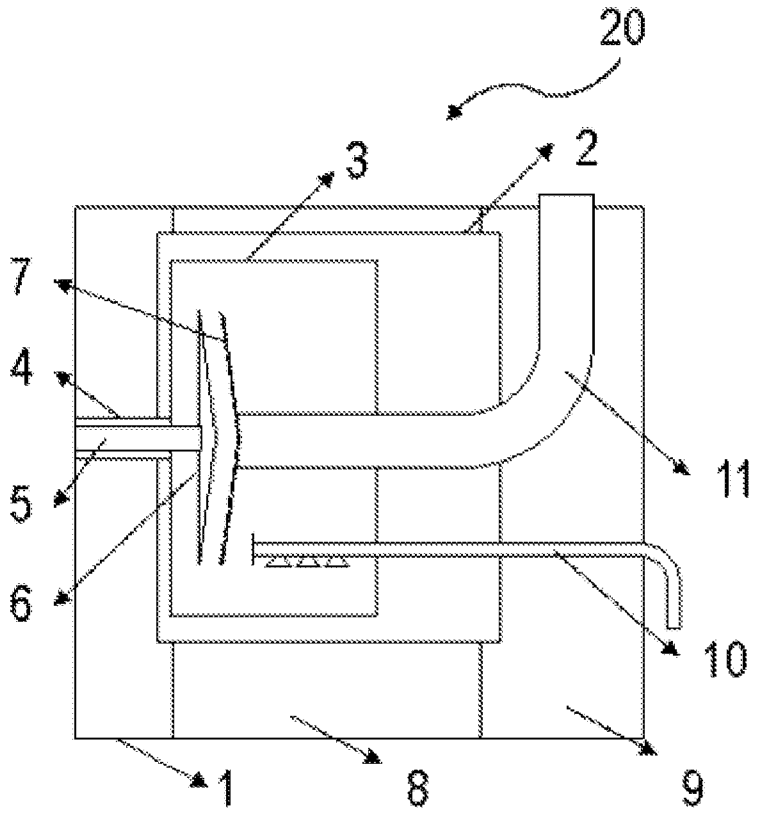
FIG. 4 is an exemplary cross-sectional view of a centrifugal dehydrator according to the related art.

First, a centrifugal dehydrator 20 according to the related art will be described with reference to FIG. 4.

The centrifugal dehydrator 20 according to the related art includes a dehydrator case 1, an inner basket 3 into which slurry is introduced, an outer basket 2 surrounding the inner basket 3, an outer basket shaft 4, an inner basket shaft 5, a slurry dispersing plate 6, a slurry discharging portion 7, a dehydration and washing water treatment region 8, a dehydration product treatment region 9, a washing water supplying portion 10, and a slurry supplying portion 11.

The centrifugal dehydrator 20 according to the related art may perform removal of moisture from polymer slurry and washing with washing water at the same time in a polymer producing process, and thus has been commonly used in the relevant field. However, there is a limitation in centrifugal force that may be provided by the centrifugal dehydrator 20, and thus it is difficult to decrease a moisture content of a product to below a predetermined value, which is problematic.

In addition, the centrifugal dehydrator 20 according to the related art has a structural characteristic in which slurry is supplied to the inner basket 3 through the slurry supplying portion 11, moisture is removed from the slurry, and then a dehydration product obtained by the removal of the moisture is discharged to the outside through the outer basket 2 and the dehydration product treatment region 9. Therefore, it is not possible to maintain airtightness of the basket, and it is thus not possible to perform pressurization by injecting gas into the basket.

On the other hand, with a pressurizing centrifugal dehydrator 100 according to the present invention, a pressurization centrifugal dehydration technique can be applied while maintaining the above-described components of the centrifugal dehydrator 20 according to the related art without any change. Therefore, an existing device is reusable. Accordingly, for the pressurizing centrifugal dehydrator 100 according to the present invention, reference numerals of the components of the centrifugal dehydrator 20 according to the related art in FIG. 4 are used as they are.

Figure 1:
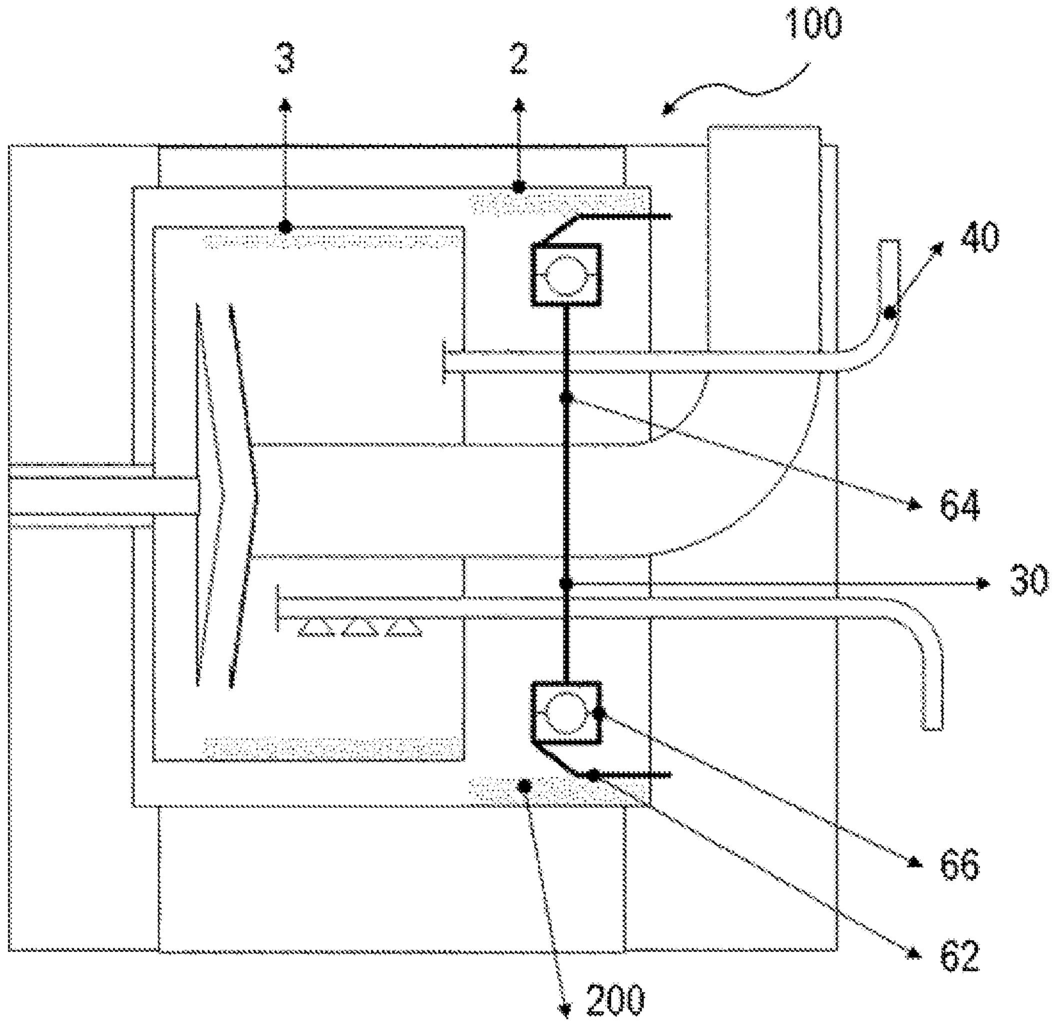
FIG. 1 is an exemplary cross-sectional view of a pressurizing centrifugal dehydrator according to the present invention.

The pressurizing centrifugal dehydrator 100 according to the present invention will be described with reference to FIG. 1. In FIG. 1, only reference numerals of main components of the pressurizing centrifugal dehydrator 100 according to the present invention are illustrated.

The pressurizing centrifugal dehydrator 100 for removing moisture according to the present invention includes an inner basket 3 into which slurry is introduced, an outer basket 2 surrounding the inner basket, a blocking barrier 30 disposed in the outer basket, and a gas supplying portion 40 for supplying gas into the inner basket 3 or outer basket 2. A dehydration product 200 can be positioned between an outer circumference of the blocking barrier 30 and an inner side of the outer basket 2 to maintain airtightness of the outer basket 2.

According to an embodiment of the present invention, the pressurizing centrifugal dehydrator 100 can include a slurry supplying portion 11 for supplying the slurry to the inner basket.

The slurry introduced through the slurry supplying portion 11 is discharged to the inner basket 3 through a slurry discharging portion 7, and the slurry discharged through the slurry discharging portion 7 can be disposed in the inner basket 3 by a slurry dispersing plate 6.

According to an embodiment of the present invention, in the pressurizing centrifugal dehydrator 100, moisture is removed from the slurry by a centrifugal force of the inner basket 3 and the outer basket 2 caused by rotation of an inner basket shaft 5 and an outer basket shaft 4, and the removed moisture (dehydration) can pass through the inner basket 3 and the outer basket 2 and be discharged through a dehydration and washing water treatment region 8.

Further, in the pressurizing centrifugal dehydrator 100, the dehydration product 200 is continuously pushed out along an inner circumferential surface of the inner basket 3 around the inner basket shaft 5 of the inner basket 3 due to reciprocation of the inner basket shaft 5 and the outer basket shaft 4, and the pushed-out dehydration product 200 can be pushed toward between the outer circumference of the blocking barrier 30 and the inner side of the outer basket 2 to move to the dehydration product treatment region 9 and be discharged to the outside.

According to an embodiment of the present invention, the length between the outer circumference of the blocking barrier 30 and the inner side of the outer basket 2 can be smaller than the height of the dehydration product 200 accumulated along an inner circumferential surface of the outer basket 2 around the outer basket shaft 4 of the outer basket 2. In this case, airtightness between the outer circumference of the blocking barrier 30 and the inner side of the outer basket 2 can be maintained due to the dehydration product 200 accumulated along the inner circumferential surface of the outer basket 2.

According to an embodiment of the present invention, the length of a region adjacent to the outer circumference of the blocking barrier 30 and the inner side of the outer basket 2 can be larger than the height of the dehydration product 200 accumulated along an inner circumferential surface of the outer basket 2 around the outer basket shaft 4 of the outer basket 2. In this case, it is possible to further increase the airtightness of the outer basket 2.

According to an embodiment of the present invention, in the pressurizing centrifugal dehydrator 100, gas is supplied to the inner basket 3 or outer basket 2 through the gas supplying portion 40 to pressurize the inside of the basket (inner and outer baskets). In a case of pressurizing the inside of the basket as described above, it is possible to improve dehydration performance of the pressurizing centrifugal dehydrator 100 due to a pressurization force caused by the gas.

Further, according to an embodiment of the present invention, the dehydration product 200 can be positioned between the blocking barrier 30 and the outer basket 2 to block the gas in the basket (inner and outer baskets) from being leaked. When the gas is supplied to the inner basket 3 or outer basket 2 in an airtight state, since moisture that is not removable only with the centrifugal force and thus remains in the dehydration product 200 can be additionally removed by the pressurization force of the supplied gas, dehydration performance can be significantly improved, as compared with the centrifugal dehydrator 20 according to the related art. That is, as two forces, the centrifugal force and the pressurization force, are applied at the same time, the dehydration performance can be improved. Although FIG. 1 illustrates a case of supplying, by the gas supplying portion 40, the gas to the inner basket 3, the gas can be supplied to the inner basket 3, the outer basket 2, or both of the inner basket 3 and the outer basket 2.

Further, according to an embodiment of the present invention, the dehydration product 200 positioned between the blocking barrier 30 and the outer basket 2 can be discharged by a dehydration product 200 pushed from the inside of the outer basket. Specifically, the discharge of the dehydration product 200 positioned between the outer circumference of the blocking barrier 30 and the inner side of the outer basket 2 can mean that a process, in which the dehydration product 200 does not remain between the outer circumference of the blocking barrier 30 and the inner side of the outer basket 2, but is discharged by being pushed by another dehydration product 200 pushed from the inside of the outer basket 2, and the another dehydration product 200 pushed from the inside of the outer basket 2 is positioned between the blocking barrier 30 and the outer basket 2, is repeated, and thus the dehydration product 200 always exists between the blocking barrier 30 and the outer basket 2.

As described above, the process, in which the dehydration product 200 is discharged by being pushed by another dehydration product 200 pushed from the inside of the outer basket 2, and the another dehydration product 200 pushed from the inside of the outer basket 2 is positioned between the blocking barrier 30 and the outer basket 2, is repeated, such that the dehydration product 200 can be continuously discharged by passing between the outer circumference of the blocking barrier 30 and the inner side of the outer basket 2.

The blocking barrier 30 will be described in more detail with reference to FIGS. 1 and 2.

According to an embodiment of the present invention, the blocking barrier 30 includes a blocking barrier rotating portion 62 that is fixed to the outer basket 2 and rotates together with the outer basket 2, a blocking barrier fixing portion 64 that is disposed in the blocking barrier rotating portion 62 and is fixed without rotating, and a rotating-fixing connection portion 66 disposed between the blocking barrier rotating portion 62 and the blocking barrier fixing portion 64.

To minimize friction between the blocking barrier 30 and the dehydration product 200, the blocking barrier 30 can be separated into the blocking barrier rotating portion 62 that rotates, and the blocking barrier fixing portion 64 that is fixed without rotating.

The blocking barrier rotating portion 62 rotates together with the outer basket 2, thereby minimizing friction caused by rotation of the dehydration product 200.

The blocking barrier fixing portion 64 can be fixed to the slurry supplying portion 11 or can be fixed to another pipe to prevent the blocking barrier 30 from being pushed by the discharged dehydration product 200 and escaping to the outside. A fixing target of the blocking barrier fixing portion 64 is not limited.

The rotating-fixing connection portion 66 connects the blocking barrier rotating portion 62 and the blocking barrier fixing portion 64, and parts such as a bearing and a roller can be used. However, the rotating-fixing connection portion 66 is not limited thereto. As such, as the rotating-fixing connection portion 66 is provided between the blocking barrier rotating portion 62 and the blocking barrier fixing portion 64, the blocking barrier rotating portion 62 rotates together with the outer basket 2, and the rotation is transferred to the rotating-fixing connection portion 66. However, the blocking barrier fixing portion 64 can be fixed.

Figure 2:
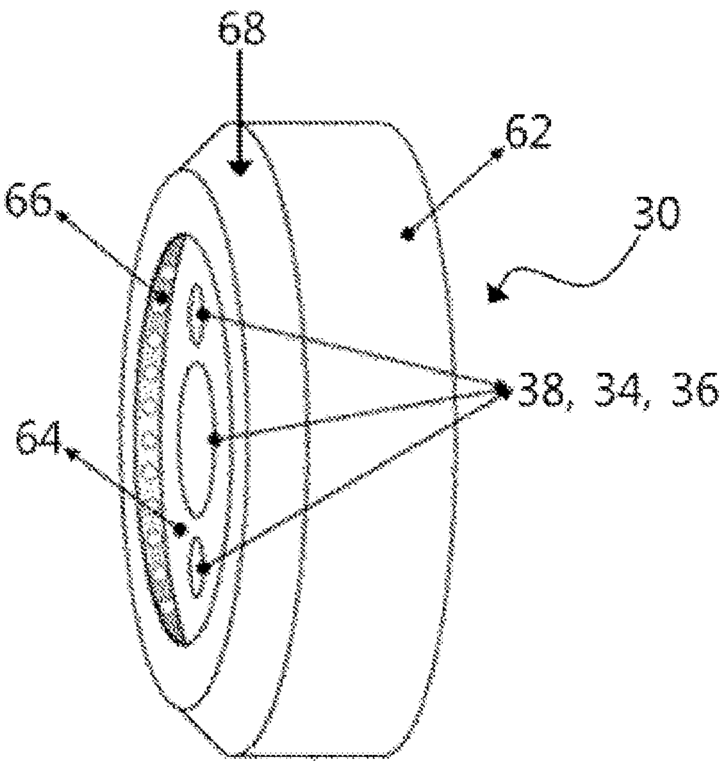
FIG. 2 is a perspective view of a blocking barrier of the pressurizing centrifugal dehydrator according to the present invention.

As illustrated in FIG. 2, an inclined portion 68 can be formed in the blocking barrier rotating portion 62. The inclined portion 68 enables smoother introduction of the dehydration product 200 between the blocking barrier rotating portion 62 and the outer basket 2, such that airtightness between the blocking barrier rotating portion 62 and the outer basket 2 is improved. That is, the inclined portion 68 serves as a guide portion. The dehydration product 200 can be continuously supplied to a dehydration product discharging portion 52 by a force in an axial direction and then discharged.

As illustrated in FIG. 1, the blocking barrier rotating portion 62 can protrude from the outer basket 2 in an axial direction of the outer basket 2 (in FIG. 1, the blocking barrier rotating portion 62 protrudes from the outer basket 2 to the right side). In this case, it is possible to more effectively maintain airtightness of the outer basket 2 and guide the dehydration product 200 moving between the outer circumference of the blocking barrier 30 and the inner side of the outer basket 2 to be discharged to the outside through the dehydration product discharging portion 52.

Referring to FIG. 2, in the blocking barrier 30, a slurry supplying portion hole 34 through which the slurry supplying portion 11 penetrates, a washing water supplying portion hole 36 through which a washing water supplying portion 10 penetrates, and a gas supplying portion hole 38 which communicates with the gas supplying portion 40 can be formed.

The gas supplying portion hole 38, the slurry supplying portion hole 34, and the washing water supplying portion hole 36 can be sequentially illustrated from top to bottom in FIG. 2, and a sequence and arrangement thereof can vary. Further, in a case where an additional pipe is provided in the centrifugal dehydrator 20 according to the related art, a hole through which the corresponding pipe can penetrate can be additionally formed in the blocking barrier 30. Accordingly, the pressurization centrifugal dehydration technique can be applied while maintaining the components of the centrifugal dehydrator 20 according to the related art without any change. Therefore, an existing device is reusable.

Figure 3:
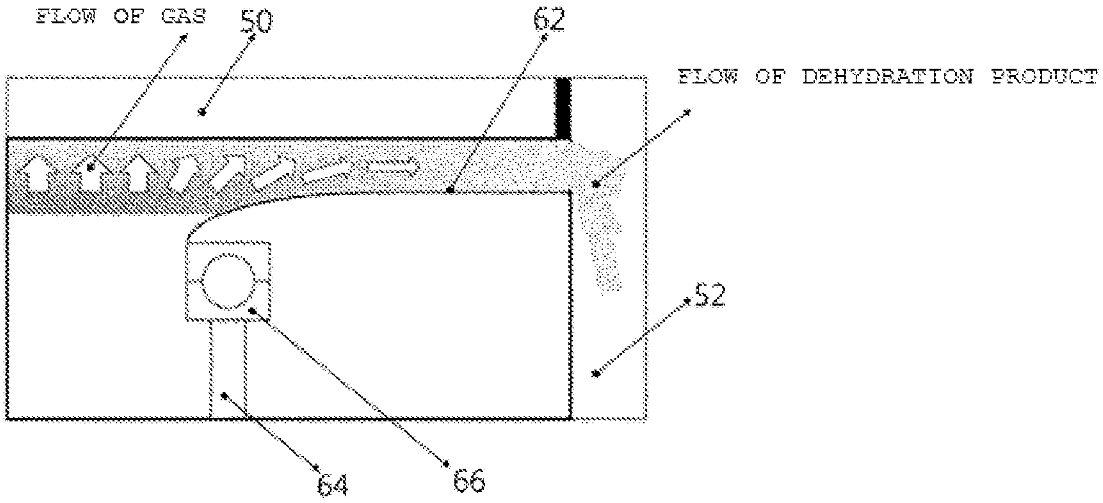
FIG. 3 is a view illustrating a flow of gas and a flow of a dehydration product in the pressurizing centrifugal dehydrator according to the present invention.

FIG. 3 illustrates a flow of gas to a moisture discharging portion 50, and a flow of the dehydration product 200 to the dehydration product discharging portion 52. As described above, the dehydration product 200 is concentrated in between the outer circumference (specifically, an outer circumference of the blocking barrier rotating portion 62) of the blocking barrier 30, and the inner side of the outer basket 2, such that it is possible to maintain airtightness of the basket. The gas supplied by the gas supplying portion 40 pressurizes the dehydration product to additionally remove moisture remaining in the dehydration product 200 in a state where the airtightness of the basket is maintained by the blocking barrier 30 and the dehydration product 200.

The spirit of the present invention has been illustratively described hereinabove. It will be appreciated by those skilled in the art that various modifications and alterations can be made without departing from the essential characteristics of the present invention. Accordingly, exemplary embodiments disclosed in the present invention are not to limit the spirit of the present invention, but are to describe the spirit of the present invention. The scope of the present invention is not limited to these exemplary embodiments. The scope of the present invention should be interpreted by the following claims, and it should be interpreted that all the spirits equivalent to the following claims fall within the scope of the present invention.

The invention claimed is:

1. A pressurizing centrifugal dehydrator for removing moisture, the pressurizing centrifugal dehydrator comprising:

an inner basket into which slurry is introduced;

an outer basket surrounding the inner basket;

a blocking barrier disposed in the outer basket; and a gas supplying portion for supplying gas into at least one of the inner basket or the outer basket, wherein a dehydration product is positioned between an outer circumference of the blocking barrier and an inner side of the outer basket to maintain airtightness of the outer basket, and wherein the blocking barrier includes:

a blocking barrier rotating portion that is fixed to the outer basket and rotates together with the outer basket;

a blocking barrier fixing portion that is disposed inside the blocking barrier rotating portion and is fixed; and a rotating-fixing connection portion disposed between the blocking barrier rotating portion and the blocking barrier fixing portion.

2. The pressurizing centrifugal dehydrator of claim 1, wherein a gas supplying portion hole, through which the gas supplying portion penetrates, is formed in the blocking barrier.

3. The pressurizing centrifugal dehydrator of claim 1, wherein a slurry supplying portion hole, through which a slurry supplying portion for supplying the slurry to the inner basket penetrates, is formed in the blocking barrier.

4. The pressurizing centrifugal dehydrator of claim 1, wherein a washing water supplying portion hole, through which a washing water supplying portion for supplying washing water to the inner basket penetrates, is formed in the blocking barrier.

5. The pressurizing centrifugal dehydrator of claim 1, wherein the dehydration product positioned between the outer circumference of the blocking barrier and the inner side of the outer basket is discharged due to a dehydration product pushed from the inside of the outer basket.

6. The pressurizing centrifugal dehydrator of claim 1, wherein the dehydration product is continuously discharged by passing between the outer circumference of the blocking barrier and the inner side of the outer basket.

7. The pressurizing centrifugal dehydrator of claim 1, wherein the rotating-fixing connection portion fixes the blocking barrier fixing portion while allowing rotation of the blocking barrier rotating portion.

8. The pressurizing centrifugal dehydrator of claim 1, wherein an inclined portion is formed in the blocking barrier rotating portion.

* * * * *